(12) United States Patent
Nguyen et al.

(10) Patent No.: US 9,319,248 B2
(45) Date of Patent: Apr. 19, 2016

(54) DECISION FEEDBACK EQUALIZER USING CURRENT MODE PROCESSING WITH CMOS COMPATIBLE OUTPUT LEVEL

(71) Applicant: NVIDIA Corporation, Santa Clara, CA (US)

(72) Inventors: Nam D Nguyen, San Jose, CA (US); Ismail H. Ozguc, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/725,847

(22) Filed: Dec. 21, 2012

(65) Prior Publication Data

US 2014/0177697 A1    Jun. 26, 2014

(51) Int. Cl.
| | | |
|---|---|---|
| H03K 5/159 | (2006.01) | |
| H04B 1/10 | (2006.01) | |
| H04L 25/03 | (2006.01) | |

(52) U.S. Cl.
CPC ............................ *H04L 25/03057* (2013.01)

(58) Field of Classification Search
CPC ............ H04L 25/03057; H04L 25/03885; H04L 2025/0349; H04L 25/03146; H04L 27/01; H04L 25/03006; H04L 25/03878; H04L 25/03019; H04L 25/0292; H04L 25/063; H04W 52/20; H03K 19/00361; H03K 17/102
USPC ........................................ 375/232, 233, 350
See application file for complete search history.

(56) References Cited

U.S. PATENT DOCUMENTS

| | | | |
|---|---|---|---|
| 5,436,937 | A | 7/1995 | Brown et al. |
| 8,126,045 | B2 * | 2/2012 | Bulzacchelli et al. ........ 375/233 |
| 2004/0091064 | A1 | 5/2004 | Cao et al. |
| 2004/0091073 | A1 | 5/2004 | Smith et al. |
| 2004/0202266 | A1 | 10/2004 | Gregorius et al. |
| 2005/0180536 | A1 | 8/2005 | Payne et al. |
| 2006/0114069 | A1 | 6/2006 | Kojima et al. |
| 2006/0158262 | A1 | 7/2006 | Robinson et al. |
| 2006/0291552 | A1 * | 12/2006 | Yeung et al. ................... 375/233 |
| 2007/0147559 | A1 * | 6/2007 | Lapointe ........................ 375/350 |
| 2008/0215947 | A1 * | 9/2008 | Hunt et al. ..................... 714/745 |
| 2009/0296867 | A1 | 12/2009 | Do et al. |
| 2010/0054324 | A1 * | 3/2010 | Bulzacchelli et al. ........ 375/233 |
| 2010/0103999 | A1 | 4/2010 | Leibowitz |
| 2010/0202506 | A1 * | 8/2010 | Bulzacchelli et al. ........ 375/233 |
| 2011/0044384 | A1 * | 2/2011 | Chung et al. ................... 375/233 |
| 2011/0243215 | A1 | 10/2011 | Wu et al. |
| 2012/0033773 | A1 | 2/2012 | Nedovic |
| 2012/0106539 | A1 | 5/2012 | Ferraiolo |
| 2012/0106687 | A1 | 5/2012 | Bulzacchelli et al. |
| 2012/0128055 | A1 | 5/2012 | Jiang |
| 2012/0151247 | A1 | 6/2012 | Ferraiolo |

(Continued)

FOREIGN PATENT DOCUMENTS

TW                201228304              7/2012

*Primary Examiner* — Don N Vo

(57) ABSTRACT

A decision feedback equalizer system is disclosed. The decision feedback equalizer system includes a current summer core that in current mode, removes inter-symbol interference from a signal, and, a CMOS latch component, that is coupled to the current summer core, that receives a current mode signal and outputs a CMOS compatible signal. The components of the decision feedback equalizer system are controlled by a single clock.

18 Claims, 11 Drawing Sheets

(56) References Cited

U.S. PATENT DOCUMENTS

| | | |
|---|---|---|
| 2012/0250811 A1 | 10/2012 | Misek et al. |
| 2013/0070882 A1 | 3/2013 | Nedovic |
| 2013/0154698 A1 | 6/2013 | Bottelli et al. |
| 2013/0249612 A1 | 9/2013 | Zerbe et al. |
| 2014/0016692 A1 | 1/2014 | Leibowitz et al. |
| 2014/0177693 A1 | 6/2014 | Zhong et al. |
| 2014/0185633 A1 | 7/2014 | Mills et al. |
| 2015/0010047 A1 | 1/2015 | Zhong et al. |

* cited by examiner

US 9,319,248 B2

DECISION FEEDBACK EQUALIZER USING CURRENT MODE PROCESSING WITH CMOS COMPATIBLE OUTPUT LEVEL

BACKGROUND

In many electronic systems, data can be transmitted or received without an accompanying timing reference. For example, a read-head of a hard disk drive can transmit a stream of data that flows from sender to receiver with no accompanying clock even though the receiver may be required to process the data synchronously. Therefore, clock or timing information related to the data must be recovered from the data at the receiver. Clock and data recovery is the process of recovering clock or timing information. A decision feedback equalizer (DFE) is a critical block in clock data recovery. It can equalize a received signal without degrading signal to noise ratio.

DFEs use information retrieved from previously received pulses of data to eliminate inter-symbol interference (ISI) on a current pulse of data. More specifically, the distortion on a current pulse that was caused by previous pulses is subtracted from the current pulse. If the values of symbols that have previously been detected are known, then the ISI contributed by these symbols can be canceled out exactly by subtracting past symbol values using appropriate weighting. As a part of this process, the trailing inter-symbol interference, caused by previous symbols, is reconstructed and subtracted.

FIG. 1 shows a diagram of a conventional half-rate DFE. The half-rate DFE of FIG. 1, is implemented using current mode logic (CML). It includes two summers, six CML latches, two CML multiplexors, two CML-to-complementary metal oxide semiconductor (CMOS) converters, synchronization CMOS circuits for the next stage, CML buffers (not shown) and dual clocks (a CML and a CMOS clock). The DFE provides an output that is received by a CMOS serialization-deserialization (SerDes) circuit (not shown in FIG. 1). Shortcomings of conventional DFE circuits such as that shown in FIG. 1 include a non-trivial level of complexity in both circuit and clock distribution aspects of their design. In addition, such circuits consume an excessive amount of power due to the amount of silicon involved in their implementation and because they process signals in voltage mode.

SUMMARY

Conventional decision feedback equalizer (DFE) systems feature a non-trivial level of complexity in both circuit and clock distribution aspects of their design. In addition, such circuits consume an excessive amount of power due to their voltage mode processing of signals and due to the excessive amount of circuitry involved in their implementation. A DFE system that uses current mode signal processing and provides a signal that has a CMOS compatible output level is disclosed that addresses these shortcomings. However, the claimed embodiments are not limited to implementations that address any or all of the aforementioned shortcomings. In one embodiment, the DFE system is implemented free of CML-to-CMOS conversion circuitry and is controlled using a single clock. Consequently, the DFE can be formed using much less circuitry and to consume much less power than conventional DFEs.

In one embodiment, a DFE system is disclosed. The DFE system includes a current summer core, that using current mode processing, removes inter-symbol interference from a signal. The DFE system further includes a CMOS latch component, that is coupled to the current summer core, and that receives a current mode signal and outputs a signal having a CMOS compatible output level. The DFE system is controlled by a single clock.

In one embodiment, an equalizer system is disclosed. The equalizer system includes a degeneration amplifier and a plurality of current summer core pairs, coupled to the degeneration amplifier, that are a part of a plurality of systems for processing a signal that is received from the degeneration amplifier. In one embodiment, at least one of the plurality of systems includes a current summer core, that using current mode processing, removes inter-symbol interference from a signal. The DFE system further includes a CMOS latch component, that is coupled to the current summer core, and that receives a current mode signal and outputs a signal having a CMOS compatible output level. The DFE system is controlled by a single clock.

In one embodiment, a method of operating a DFE system is disclosed. The method includes, receiving into a current summer core, a data bit and a determined measure of inter-symbol interference. The determined measure of inter-symbol interference is subtracted from the data bit to generate an equalized data bit. Access is provided to the equalized data bit at a CMOS compatible output level.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
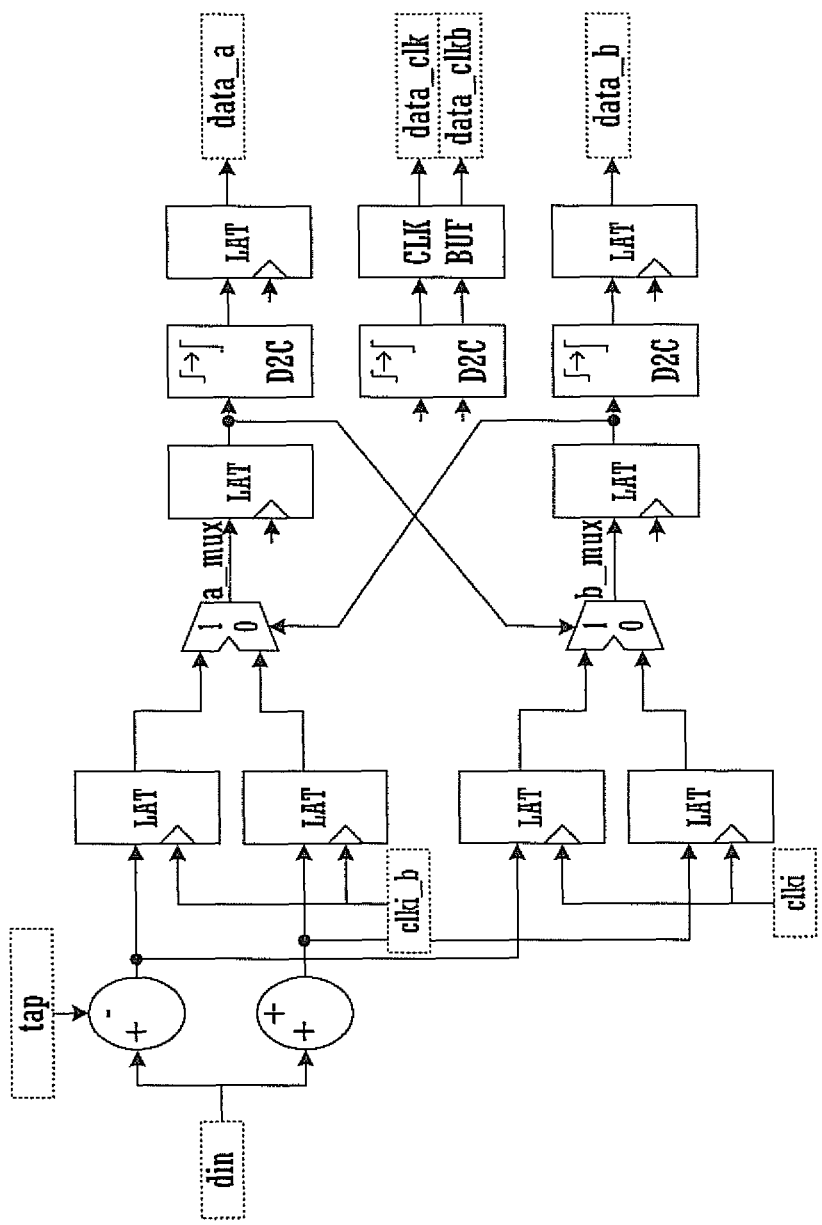
FIG. 1 shows a diagram of a conventional half-rate decision feedback equalizer (DFE).

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "subtracting" or "providing" or "providing access" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 2A:
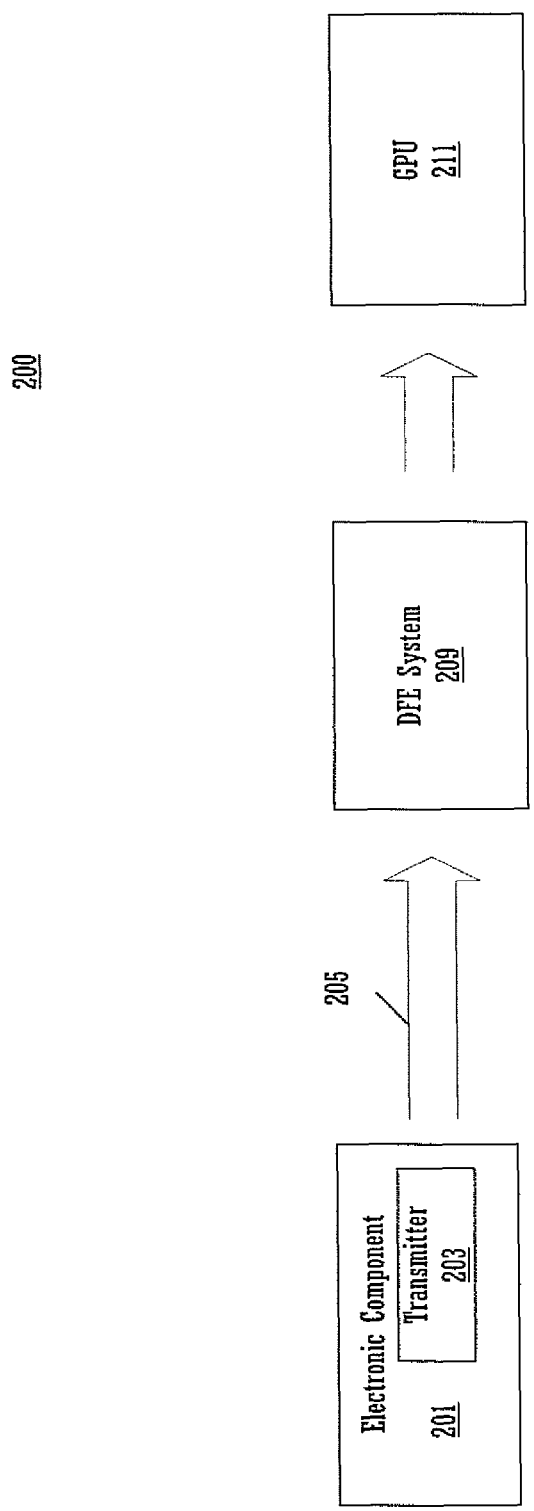
FIG. 2A shows an exemplary operating environment of a DFE system that uses current mode processing and that provides a complementary metal oxide semiconductor (CMOS) compatible output level according to one embodiment of the present invention.

Exemplary Operating Environment of Decision
Feedback Equalizer Using Current Mode Processing
with CMOS Compatible Output Level According to
One Embodiment FIG. 2A shows an exemplary operating environment 200 of a decision feedback equalizer (DFE) system 201 that uses current mode processing and that provides a signal that has a complementary metal oxide semiconductor (CMOS) compatible output level according to one embodiment. In one embodiment, DFE system 201 processes a signal by eliminating inter-symbol interference (ISI) on current pulses using a current summer core, and provides an output from a CMOS latch that comprises CMOS compatible signals. In FIG. 2A, exemplary operating environment includes electronic component, transmitter 203, channel 205, DFE system 209 and GPU 211.

Referring to FIG. 2A, electronic component 201 (e.g., hard drive etc.) includes transmitter 203, that outputs data that is sent over channel 205 (e.g., a point to point link between two ports, such as, for example, two PCIe ports) to DFE system 209. In one embodiment, DFE system 209 can process the received data as a part of a clock and data recovery (CDR) system such that it can be used by another electronic component such as GPU 211. In one embodiment, DFE system 209 can be a part of a PCIe device. In another embodiment, system 209 can be separate from a PCIe device but operate cooperatively therewith. In one embodiment, DFE system 209 operates to equalize the received signal without degrading its signal to noise ratio. Moreover, as described herein, DFE system 209 features an efficient circuit and clock distribution scheme. GPU 211 can generate graphic images based on the data that is received from electronic component 201 (and equalized by DFE system 209) and can provide the graphic images for presentation. In other embodiments, DFE system 209 can be used as a part of other electronic components, such as an analog-to-digital conversion (ADC) circuit.

Exemplary Decision Feedback Equalizer System

Figure 2B:
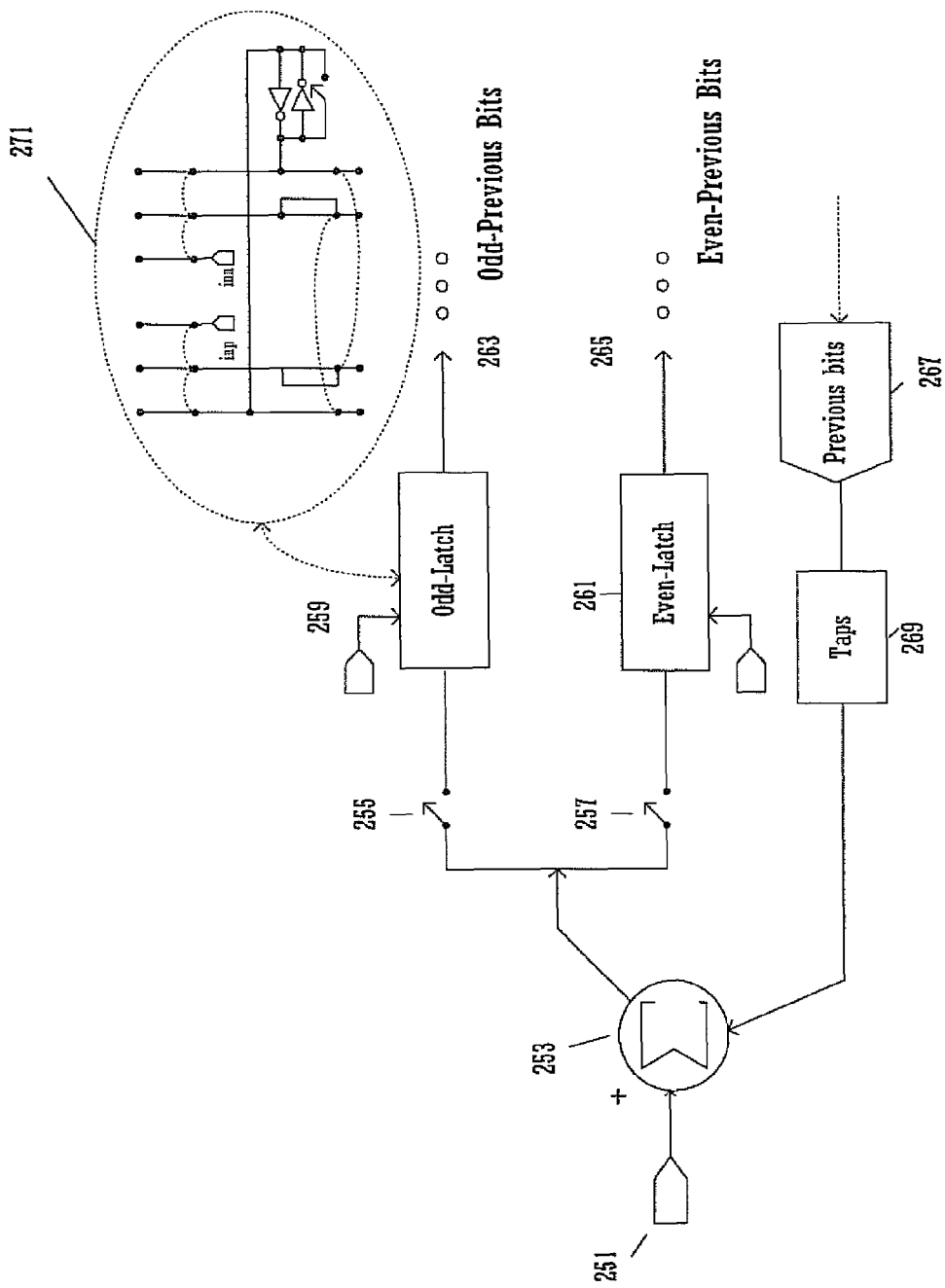
FIG. 2B shows an exemplary DFE system according to one embodiment of the present invention.

FIG. 2B shows an exemplary DFE system 209 according to one embodiment. DFE system 209 features an efficient circuit and clock distribution design as compared to conventional DFE systems. In addition, DFE system 209 consumes less power as compared to conventional systems because it processes signals in current mode as opposed to voltage mode and can be formed using less circuitry. In the FIG. 2B embodiment, DFE system includes input 251, summer 253, switch A 255, switch B 257, odd-latch 259, even-latch 261, odd previous bits 263, even previous bits 265, previous bits 267 and current taps 269. In one embodiment, summer 253 can include a voltage to current converter that converts a voltage input to current.

Referring to FIG. 2B, summer 253 subtracts ISI from individual bits of incoming signal 251. In one embodiment, the ISI to be subtracted is determined by slicing and delaying a previous bit 267 and then multiplying the result by an equalization or "tap" coefficient 269. The determined ISI is then directly subtracted (by being input to summer 253) from individual bits of the incoming signal. The signal that is output from summer 253 includes odd and even numbered bits. Switch A 255 and switch B 257 separate the odd and even numbered bits and respectively provide the separated bits to odd latch 259 and even latch 261. In one embodiment, this approach saves energy by steering even and odd numbered bits from summer 253 directly to respective latches 259 and 261. In one embodiment, latches 259 and 261 can be implemented with a latch and current mirror topology as shown at 271.

In one embodiment, odd-latch 259, in response to the input of an odd numbered bit, provides a level shifted output of the odd numbered bit (see odd-previous bits 263 in FIG. 2B) for processing to subsequent stages of the clock and data recovery system. Likewise, even-latch 261, in response to the input of an even numbered bit, provides a level shifted output of the even numbered bit (see even-previous bits 265 in FIG. 2B) for processing to subsequent stages of the clock and data recovery system. The equalized odd and even numbered bits are output as CMOS compatible signals for use by subsequent CMOS stages. In addition, the odd and even numbered previous bits, 263 and 265, constitute the previous bits 267 from which ISI that is to be subtracted from individual bits of incoming signal 251 is determined.

Figure 2C:
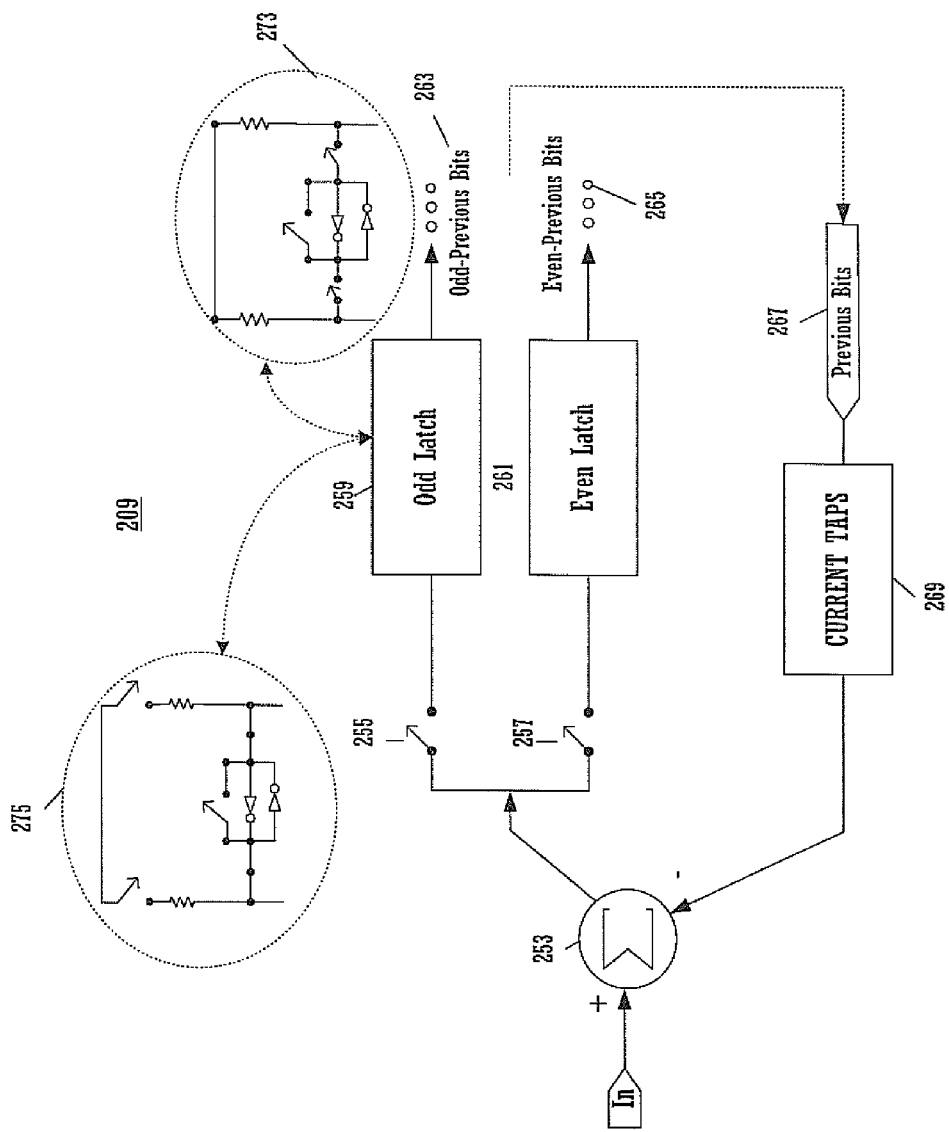
FIG. 2C shows a DFE system that includes latch components that can be implemented using different latch topologies according to one embodiment of the present invention.
Figure 2D:
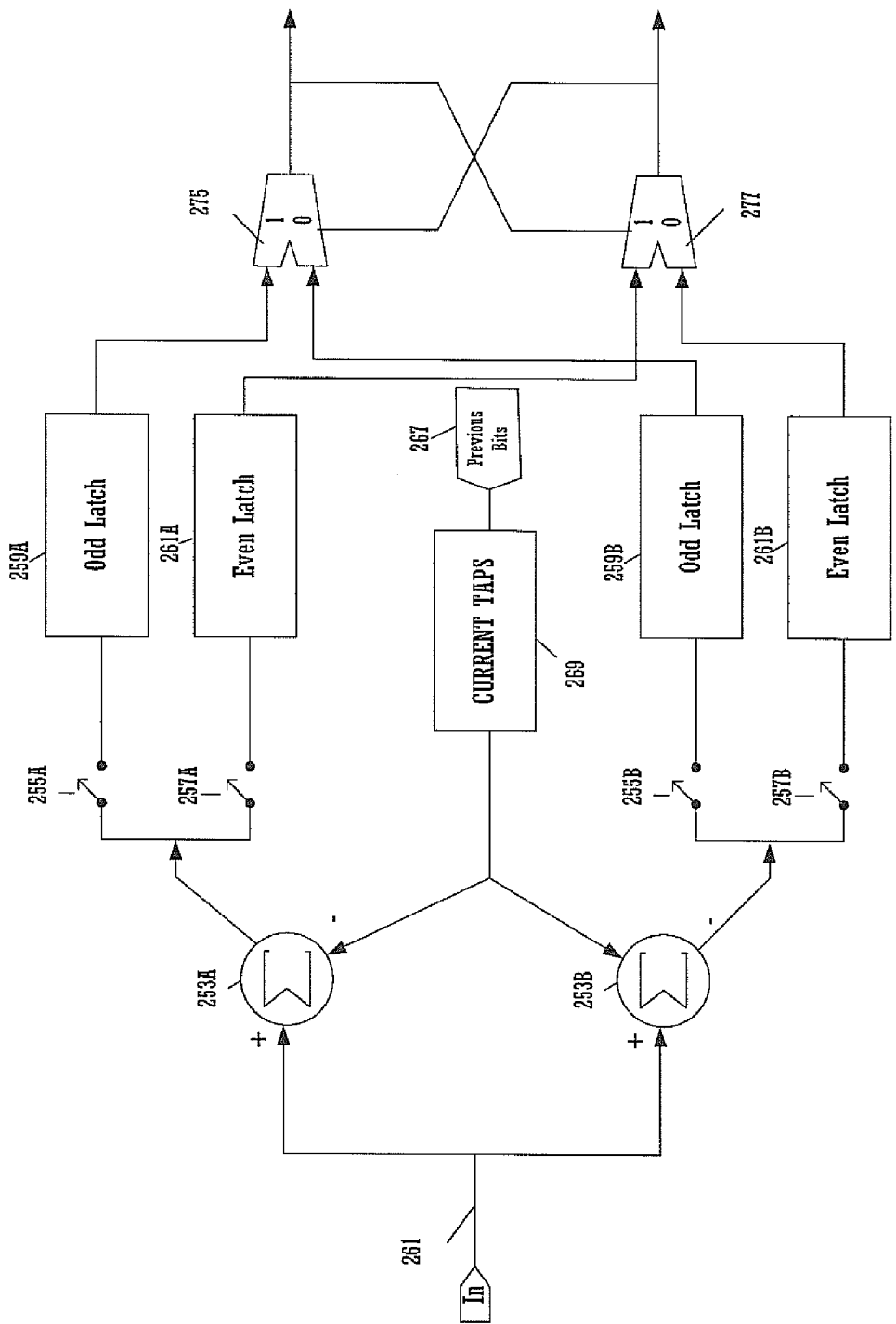
FIG. 2D shows an exemplary half-rate version of the DFE system shown in FIG. 2B according to one embodiment of the present invention.
Figure 2E:
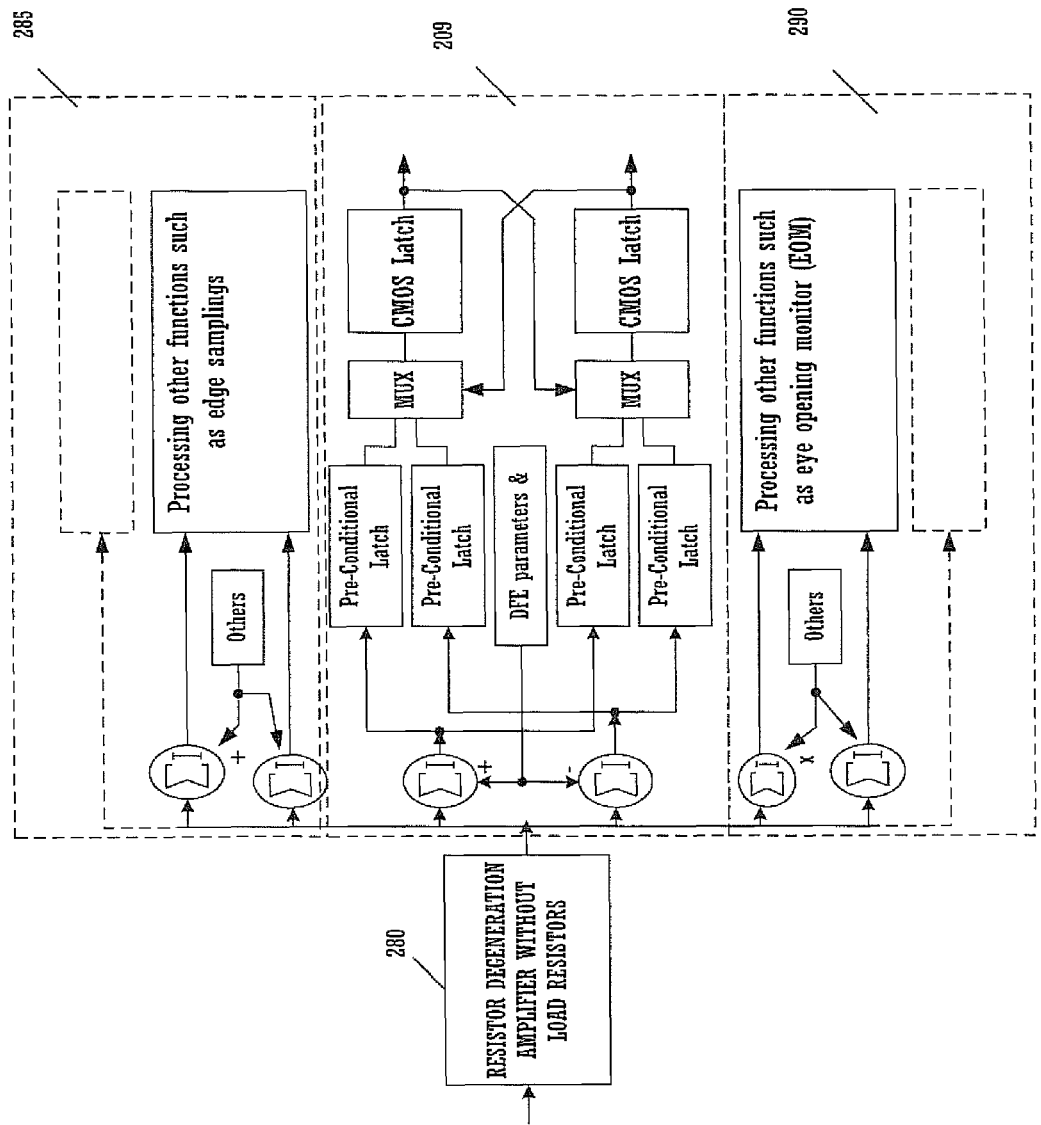
FIG. 2E shows a plurality of half rate signal processing circuits that are coupled to receive a common input signal according to one embodiment of the present invention.

FIGS. 2C-2E show other exemplary embodiments of DFE system 209 according to one embodiment. In one embodiment, the DFE systems shown in FIGS. 2C-2E function similarly to the DFE system described with respect to FIG. 2B but can comprise additional features. DFE system 209 of FIG. 2C includes latch components that can be implemented to use different latch topologies. For example, a latch topology that includes switches in parallel branches of the latch circuit 275, and a latch topology that include switches at each side of cross-coupled inverters of the latch circuit 273. FIG. 2D shows a half-rate embodiment of DFE system 209 of FIG. 2B. Referring to FIG. 2D, half-rate DFE system 209 includes summer 253A, summer 253B, odd latch 259A, even latch 261A, odd latch 259B and even latch 261B, multiplexer 275 and multiplexer 277. In this embodiment, a half rate clock drives the duplicate paths at opposite clock phases. Accordingly, control switches back and forth between paths generating even and odd bit sequences. FIG. 2E shows an embodiment that includes a plurality of half rate signal processing circuits that are coupled to receive a common input signal. The input signal is provided via resistor degeneration amplifier 280 which provides voltage to current conversion. In this embodiment, in addition to DFE system 209 (which is shown providing an output to CMOS latches), other half rate circuit processing circuits 285 and 290 with similar designs can be coupled to provide various functions with respect to the input signal. In this embodiment, taps can be adjusted to fulfill a signal processing criterion, in order to support functions such as eye opening monitoring (e.g., 290) and edge sampling (e.g., 285).

Operation

Figure 2F:
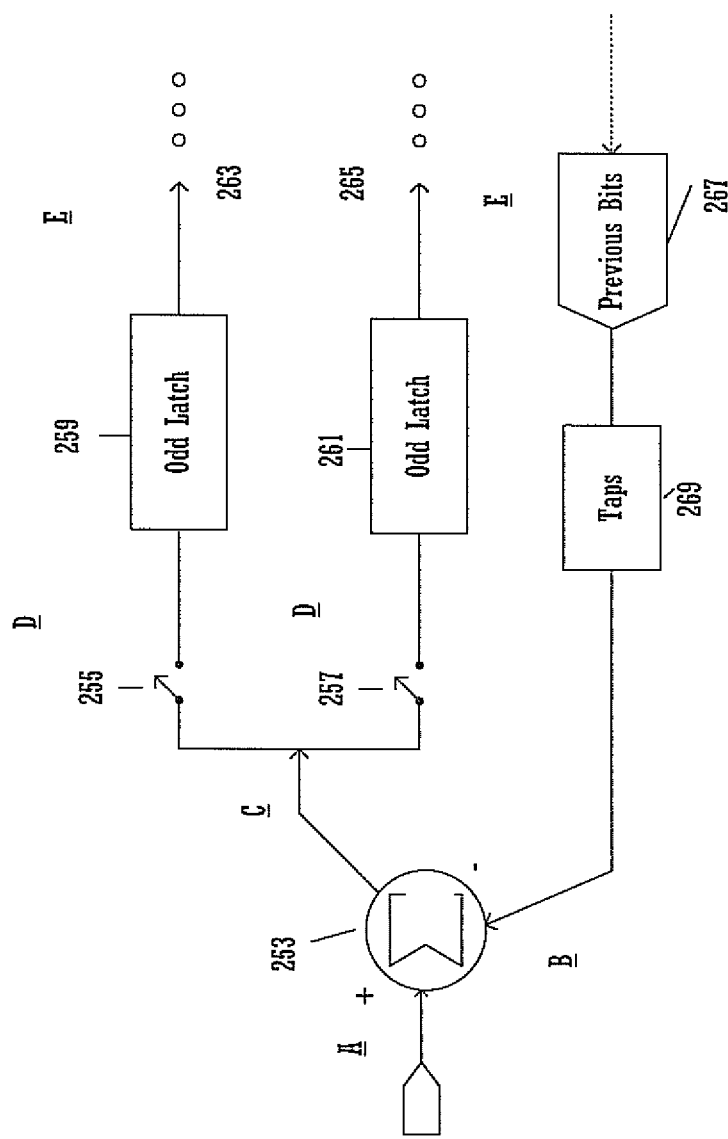
FIG. 2F illustrates operations performed by an exemplary DFE system according to one embodiment of the present invention.

FIG. 2F illustrates operations performed by DFE 209 according to one embodiment. These operations, are illustrated for purposes of clarity and brevity. It should be appreciated that other operations not illustrated in FIG. 2F can be performed in accordance with one embodiment.

Current Mode Processing

Referring to FIG. 2F, at A, data that is transmitted over a channel (e.g., 205 in FIG. 2A) is received by current summer core 253. And, at B, a representation of ISI that is determined by slicing, delaying and multiplying a previous bit 267 by an equalization or "tap" coefficient ("current tap") is input into current summer core 253 and subtracted from the received bit. At C, switches 255 and 257 are used to separate even and odd numbered bits that are output from current summer core 253.

CMOS Compatible Output Level

Referring to FIG. 2F, at D, the odd numbered bits are provided as input to CMOS odd-latch 259 which provides a level shifted output of odd numbered bits. And, the even numbered bits are provided as input to CMOS even-latch 261 which provides a level shifted output of odd numbered bits 263. At E, the equalized bits are output as CMOS compatible signals for use by subsequent CMOS stages.

Figure 3:
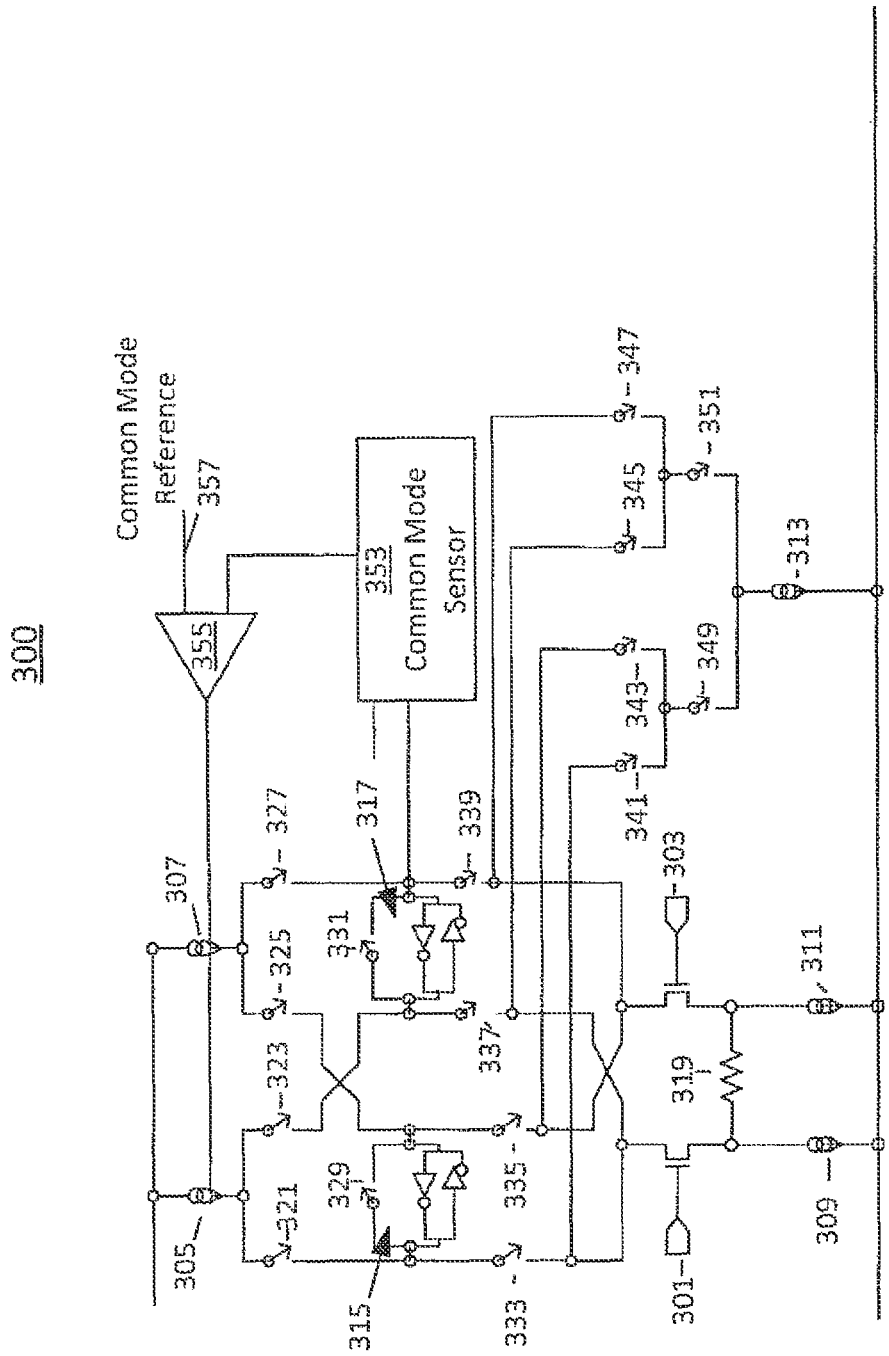
FIG. 3 shows an exemplary differential current summer core and latch combination according to one embodiment of the present invention.

Exemplary Component Circuits of a Decision Feedback Equalizer According to One Embodiment FIGS. 3-6 are schematics that show exemplary details of the component circuits of the decision feedback equalizer (DFE) system described herein according to one embodiment. FIG. 3 shows an exemplary differential current summer core-latch combination 300 according to one embodiment. In the FIG. 3 embodiment, differential summer core-latch combination 300 includes inputs 301 and 303, current sources 305 and 307, current sources 309 and 311, current source 313, latches 315 and 317, resistor 319, clocks 321-351 common mode sensor 353, comparator 355 and common mode reference signal 357. Referring to FIG. 3, individual bits of an incoming signal are input to summer core 300 at input 301. An adjustment signal is input to input 303 that corresponds to inter-symbol interference (ISI). Based on the adjustment signal summer core 300 subtracts ISI from individual bits of the incoming signal. The outputs are provided as input to latches 315 and 317 as is described herein in detail. In the FIG. 3 embodiment, multiple current taps can be used. In one embodiment, as shown in FIG. 3, common mode sensor 353 is coupled to latch 317 and detects variations in the current level that is output by latch 317 (e.g., variations caused by phenomena such as changes in temperature, process, etc.). Common mode sensor 353 generates a signal based on the detected variations that is input to comparator 355. Comparator 355 compares this input to common mode reference 357 and generates an output signal. The output signal generated by comparator 355 is used to adjust current sources 305 and 307 (such that desired current levels are maintained) in response to the current level variations detected by common mode sensor 353.

Figure 4:
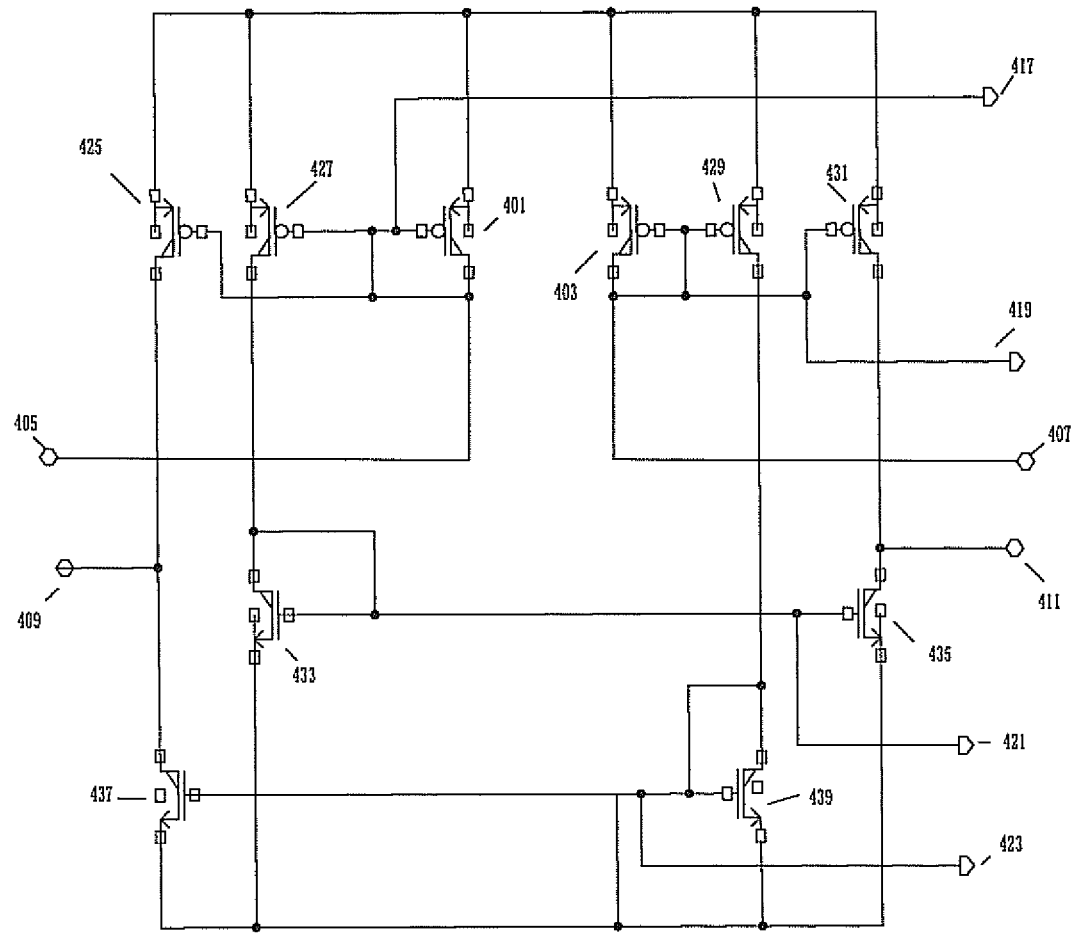
FIG. 4 shows an exemplary differential current summer core according to one embodiment of the present invention.

FIG. 4 shows an exemplary differential current summer core 400 according to one embodiment. In the FIG. 4 embodiment, current summer core includes differential transistor pair 401 and 403, input 405, input 407, output 409, output 411, positive rail 417, positive rail 419, negative rail 421, negative rail 423 and other transistors 425, 427, 429, 431, 433, 435, 437 and 439. Referring to FIG. 4, individual bits of an incoming signal are input to summer core 400 at input 405. An adjustment signal is input to summer core 400 at input 407 that corresponds to ISI. Based on the adjustment signal, summer core 400 subtracts ISI from individual bits of the incoming signal. The outputs are taken from outputs 409 and 411 and are provided as input to a latch as is described herein in detail.

Figure 5:
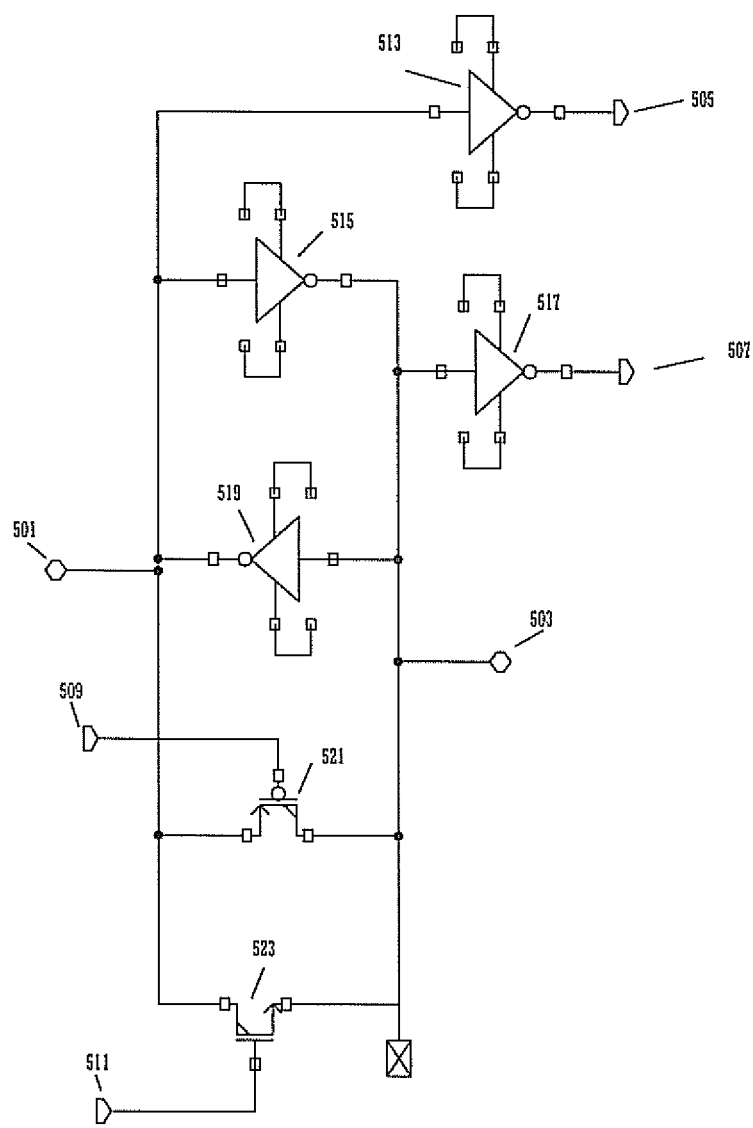
FIG. 5 shows an exemplary pre-conditional latch according to one embodiment of the present invention.

FIG. 5 shows an exemplary pre-conditional latch 500 according to one embodiment. In the FIG. 5 embodiment, pre-conditional latch includes inputs 501 and 503, outputs 505 and 507, clocks 509 and 511, inverters 513, 515, 517, 519 and transistors 521 and 523. Referring to FIG. 5, individual bits of a signal output from a current summer core (such as current summer core 253 in FIG. 2A) are input to pre-conditional latch 500. Pre-conditional latch 500 receives the input from the current summer core (such as current summer core 253 in FIG. 2A) provides a signal having a CMOS compatible output level.

Figure 6:
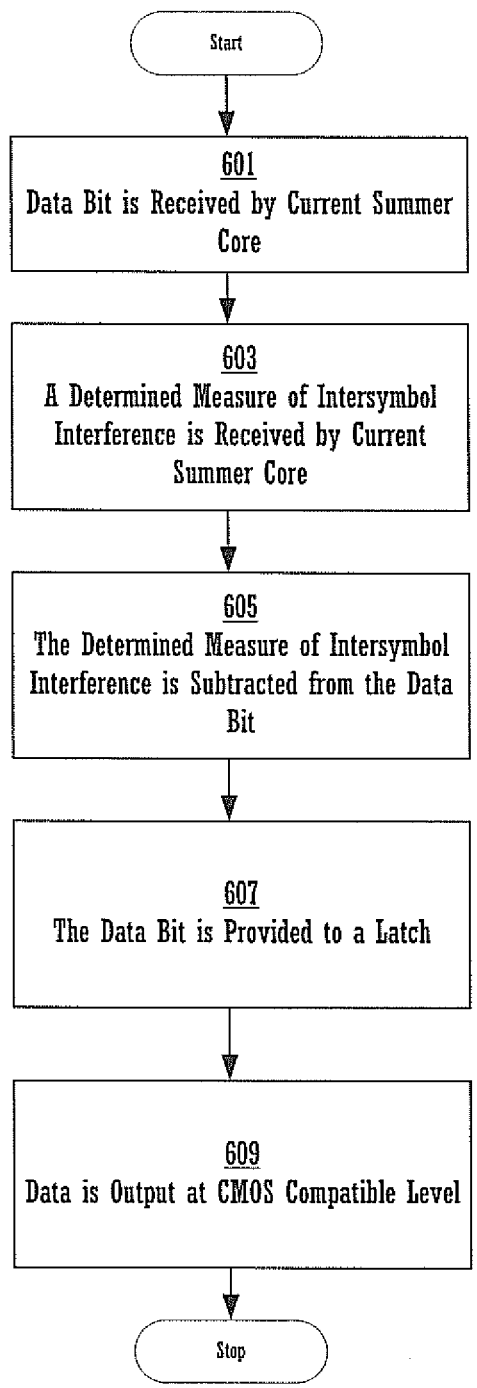
FIG. 6 shows a flowchart of the operations performed in a method of operating a DFE system according to one embodiment of the present invention.

Method of Operating a Decision Feedback Equalizer Using Current Mode Processing with CMOS Compatible Output Level According to One Embodiment FIG. 6 shows a flowchart 600 of the operations performed in a method of operating a decision feedback equalizer (DFE) according to one embodiment. The flowcharts include processes that, in one embodiment can be carried out by electrical components. Although specific operations are disclosed in the flowcharts, such operations are exemplary. That is the present embodiment is well suited to performing various other operations or variations of the operations recited in the flowchart.

Referring to FIG. 6, at 601 a bit of data is received into a current summer core of the DFE system.

At 603, a determined measure of inter-symbol interference is received by the current summer core.

At 605, the determined measure of inter-symbol interference is subtracted from the bit of data to generate an equalized data bit.

At 607, the equalized data bit is provided to a CMOS latch that is directly coupled to the current summer core.

At 609, access is provided to the equalized data at a CMOS compatible output level.

With regard to exemplary embodiments thereof, a decision feedback equalizer system is disclosed. The decision feedback equalizer system includes a current summer core that in current mode, removes inter-symbol interference from a signal, and, a CMOS latch component, that is coupled to the current summer core, that receives a current mode signal and outputs a CMOS compatible signal. The components of the decision feedback equalizer system are controlled by a single clock.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A decision feedback equalizer system, said system comprising:
   a degeneration amplifier comprising a current output;
   a current summer core comprising a current mirror, that in current mode, is operable to subtract inter-symbol interference from a signal, wherein said current output is connected to said current mirror; and
   a CMOS latch component coupled to said current summer core, that is operable to receive a current mode signal and operable to output a CMOS compatible signal, wherein components of said decision feedback equalizer system are controlled by a single clock, wherein said current summer core is further operable to provide current mode signal processing, and wherein said CMOS latch component is operable to provide a CMOS compatible output level.

2. The system of claim 1 wherein said decision feedback equalizer system is free of a current mode logic to CMOS converter.

3. The system of claim 1 wherein said CMOS latch component comprises switches coupled in series with resistors in parallel branches of said CMO latch component.

4. The system of claim 1 wherein said CMOS latch component comprises switches that are coupled to the input and output of cross coupled inverters.

5. The system of claim 1 wherein said current summer core comprises a differential current summer core.

6. The system of claim 1 further comprising a plurality of PMOS current sources and a plurality of switches wherein said CMOS latch component is coupled to said plurality of PMOS current sources and said plurality of corresponding switches.

7. The system of claim 6 wherein said plurality of switches comprise a common mode sensor.

8. An equalizer system, said system comprising:
   a degeneration amplifier comprising a current output;
   a plurality of current summer core pairs, coupled to said degeneration amplifier, that are a part of a plurality of systems for processing a signal received from said degeneration amplifier, wherein at least one of said plurality of systems comprise:
      a current summer core comprising a current mirror, that in current mode, is operable to remove inter-symbol interference from a signal, wherein said current output is connect to said current mirror directly; and
      a CMOS latch component coupled to said current summer core, that is operable to receive a current mode signal and outputs a CMOS compatible signal, wherein components of said decision feedback equalizer system are controlled by a single clock and wherein said current summer core provides current mode signal processing and said CMOS latch component provides a CMOS compatible output level.

9. The system of claim 8 wherein said decision feedback equalizer is free of a current mode logic to CMOS converter.

10. The system of claim 8 wherein said CMOS latch comprises switches coupled in series with resistors in parallel branches of said latch.

11. The system of claim 8 wherein said CMOS latch comprises switches
    that are coupled to the input and outputs of cross coupled inverters.

12. The system of claim 8 wherein said current summer core comprises a differential current summer core.

13. The system of claim 8 further comprising a plurality of PMOS current sources and a plurality of switches wherein said CMOS latch is coupled to said plurality of PMOS current sources and said plurality of corresponding switches.

14. The system of claim 13, wherein said plurality of switches comprise a common mode sensor.

15. A method of operating a decision feedback equalizer system, said method comprising:
    receiving a bit of data into a current summer core of said decision feedback equalizer system;
    receiving into said current summer core a determined measure of inter-symbol interference;
    subtracting said determined measure of inter-symbol interference from said bit of data to generate an equalized data bit;
    providing said equalized data bit to a CMOS latch that is directly coupled to a current mirror of said current summer core; and
    providing access to said equalized data bit at a CMOS compatible level wherein said current summer core provides current mode signal processing and said CMOS latch component provides said CMOS compatible output level.

16. The method of claim 15 wherein said decision feedback equalizer system is free of a current mode logic to CMOS converter.

17. The method of claim 15 wherein said CMOS latch comprises switches coupled in series with resistors in parallel branches of said latch.

18. The method of claim 15 wherein said CMOS latch comprises switches that are coupled to the input and outputs of cross coupled inverters.

\* \* \* \* \*